United States Patent
Dilts et al.

(10) Patent No.: US 9,227,193 B2
(45) Date of Patent: Jan. 5, 2016

(54) COUNTER KNIFE BANK DEBRIS DEFLECTOR

(71) Applicant: CNH Industrial America LLC, New Holland, PA (US)

(72) Inventors: Mark D. Dilts, New Holland, PA (US); Nathan E. Isaac, Lancaster, PA (US); Craig E. Murray, Davenport, IA (US); Nicholas S. Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 55 days.

(21) Appl. No.: 14/267,317

(22) Filed: May 1, 2014

(65) Prior Publication Data

US 2014/0326815 A1 Nov. 6, 2014

Related U.S. Application Data

(60) Provisional application No. 61/818,102, filed on May 1, 2013.

(51) Int. Cl.
| | |
|---|---|
| *B02C 18/16* | (2006.01) |
| *A01F 12/40* | (2006.01) |
| *A01F 29/04* | (2006.01) |
| *B02C 23/24* | (2006.01) |

(52) U.S. Cl.
CPC ............... *B02C 18/16* (2013.01); *A01F 12/40* (2013.01); *A01F 29/04* (2013.01); *B02C 23/24* (2013.01); *B02C 2018/164* (2013.01)

(58) Field of Classification Search
CPC .. B02C 18/16; B02C 23/24; B02C 2018/164; A01F 29/04; A01F 12/40

USPC ............. 241/54, 238, 243, 286, 101.74, 241/101.741, 101.742; 460/111; 56/12.8, 56/13.2, 14.3, 14.5

See application file for complete search history.

(56) References Cited

U.S. PATENT DOCUMENTS

| | | | |
|---|---|---|---|
| 3,669,122 A * | 6/1972 | Rowland-Hill | ................. 460/73 |
| 4,677,991 A | 7/1987 | Harris et al. | |
| 6,863,605 B2 | 3/2005 | Gryspeerdt et al. | |
| 7,066,810 B2 | 6/2006 | Farley et al. | |
| 7,094,146 B2 | 8/2006 | Holmen | |
| 7,297,053 B2 | 11/2007 | Farley | |
| 7,455,584 B2 | 11/2008 | Farley et al. | |
| 7,473,169 B2 | 1/2009 | Isaac | |
| 7,651,391 B2 | 1/2010 | Weichholdt et al. | |

(Continued)

FOREIGN PATENT DOCUMENTS

GB 816421 * 7/1959

*Primary Examiner* — Mark Rosenbaum
(74) *Attorney, Agent, or Firm* — Patrick M. Sheldrake

(57) ABSTRACT

A chopper assembly for harvesting equipment including a rotary chopper device with a plurality of knives and a cylindrical chopper grate assembly spaced from the rotary chopper to form a passageway for crop residue. The chopper grate assembly includes a plurality of slots extending in the direction of crop residue flow. A knife bank assembly includes a plurality of knife elements aligned with and insertable in the slots with the knife bank assembly being displaceable toward and between a position where the bank knife elements are fully inserted through the slots into the passageway and a position where they are substantially clear of the passageway. A deflector is provided for covering the slots and the deflector is displaceable with the knife elements to uncover the slots as the knife elements are displaced through the slots and into the passageway.

20 Claims, 6 Drawing Sheets

(56) References Cited

U.S. PATENT DOCUMENTS

| | | |
|---|---|---|
| 7,717,779 B1 | 5/2010 | Weichholdt et al. |
| 7,731,576 B2 | 6/2010 | Isaac et al. |
| 7,896,732 B2 | 3/2011 | Benes et al. |
| 8,141,805 B1 | 3/2012 | Isaac et al. |
| 2012/0270613 A1 | 10/2012 | Isaac et al. |

* cited by examiner

COUNTER KNIFE BANK DEBRIS DEFLECTOR

CROSS REFERENCE TO RELATED APPLICATIONS

This is a non-provisional application based upon U.S. provisional patent application Ser. No. 61/818,102, entitled "COUNTER KNIFE BANK DEBRIS DEFLECTOR", filed May 1, 2013, which is incorporated herein by reference.

FIELD OF THE INVENTION

The present application relates to chopper assemblies for a combine and more specifically to a system in which debris is deflected from the counter knife bank assemblies used in such combines.

DESCRIPTION OF THE RELATED ART

Harvesting equipment such as agricultural combines frequently use integral chopper assemblies or systems to transport material away from the threshing system and also to treat the material by further cutting. It is frequently necessary to employ a residue chopper assembly that has a rotary chopper apparatus disposed within the combine housing and extending generally transverse across the path of the crop residue. A chopper grate assembly extends along the rotary chopper apparatus and has a plurality of slots through which knives attached to a counter knife bank apparatus adjustably project. The interaction between the rotary chopper and the counter knife bank apparatus cuts and reduces the size of the crop residue. In order to accommodate variable field and/or crop conditions it is necessary to provide a variation in the degree to which the knives of the counter knife bar apparatus extend through the slots in the chopper grate. The knives, when fully inserted through the slots in the chopper grate, produce a fine consistency to the chopped crop residue whereas the retraction of the knives from the slots produces a coarser consistency.

The harvesting and threshing process produces a great deal of crop residue which is accelerated through the combine and propelled rearward by the crop processing system (rotor) used in the processing of the crop material. Since the rotary chopper assembly is at the downstream end of the path of the crop residue, it is fully impacted by the debris carried around in the flow path through the combine. It has been found that the debris particularly collects adjacent the slots on the chopper grate and can span the space adjacent the leading edge of the knife elements used in the counter knife bar apparatus. The accumulation of the debris across the slots prevents free movement of the counter knife bar apparatus and requires frequent cleaning of the mechanism. Depending upon the configuration of the combine the cleaning process can be particularly complicated.

What is needed in the art therefore, is a chopper assembly in which debris is prevented from accumulating in the area between the chopper grate and the counter knife bar apparatus.

SUMMARY OF THE INVENTION

The invention seeks to provide a mechanism for preventing debris from accumulating between the chopper grate and the counter knife bar assemblies.

The invention, in one form, is a chopper assembly for harvesting equipment including a rotary chopper device and a chopper grate assembly spaced from the rotary chopper device to form a passage way for crop residue. The chopper grate assembly includes a plurality of slots extending in the direction of crop residue flow through the passageway. A knife bank assembly includes a plurality of knife elements aligned with and insertable in the slots. The knife bank assembly is displaceable toward a position where the knife elements are fully inserted through the slots into the passageway and a position where they are substantially clear of the passageway. A deflector is provided for covering the slots with the deflector being displaceable with the knife elements to uncover the slots as the knife elements are displaced through the slots and into the passageway.

The invention, in another form, is an agricultural combine with a crop processing apparatus to separate desired crop material from residue and a chopper assembly for receiving crop residue. The chopper assembly includes a rotary chopper device and a chopper grate assembly spaced from the rotary chopper device to form a passageway for crop residue. The chopper grate assembly includes a plurality of slots extending in the direction of crop residue flow through the passageway. A knife bank assembly includes a plurality of knife elements aligned with and insertable in the slots. The knife bank assembly is displaceable toward a position where the knife elements are fully inserted through the slots into the passageway and a position where they are substantially clear of the passageway. A deflector is provided for covering the slots with the deflector being displaceable with the knife elements to uncover the slots as the knife elements are displaced through the slots and into the passageway.

The invention, in yet another form, is a chopper assembly for harvesting equipment including a blower for processing crop residue and a rotary chopper device with a chopper grate assembly spaced from the rotary chopper device to form a passageway for crop residue. The chopper grate assembly includes a plurality of slots extending in the direction of crop residue flow through the passageway. A knife bank assembly includes a plurality of knife elements aligned with and insertable in the slots. The knife bank assembly is displaceable toward a position where the knife elements are fully inserted through the slots into the passageway and a position where there are substantially clear of the passageway. A deflector is positioned to direct flow of air from the blower to the vicinity of the slots and the knife elements extending through the slots.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
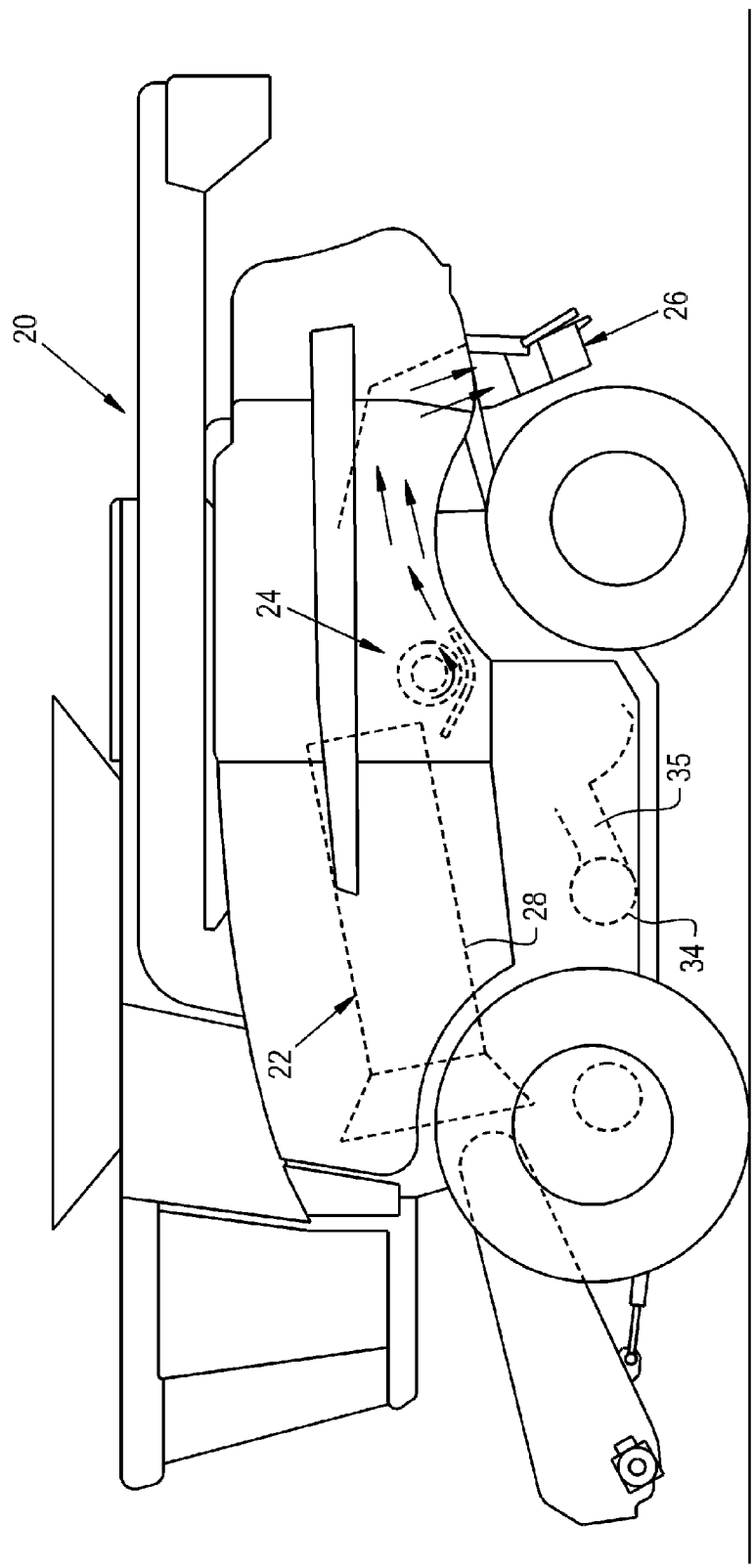
FIG. 1 is a side view of a combine incorporating a chopper assembly embodying the present invention.

FIG. 1 shows an agricultural combine 20 which includes the usual harvesting apparatus (not all of which is shown to facilitate an understanding of the invention). An axially oriented crop processing system 22 receives harvested crop and a crop residue treatment and distribution system 24 with a crop residue spreader 26 is positioned at the aft end of combine 20. The crop processing system includes a cylindrical threshing rotor 28 that conveys a flow of crop material in a helical flow path. As the crop material is moved through the processing apparatus 22, the desired crop such as grain or other material is loosened and separated from crop residue such as husk and pods in a cleaning system located beneath the threshing rotor 28. The crop processing system 22 includes a blower 34, schematically depicted to aid in the separation of the desired crop from the crop residue. The blower 34 has a duct 35 extending aft in the combine 20 towards the cleaning system and the crop residue treatment and distribution system 24.

Existing crop residue systems provide the ability to variably chop the crop residue but encounter the problems of crop residue plugging the adjustable apparatus. In accordance with the present invention, the crop residue treatment system 24 shown in FIGS. 2-4 minimizes, if not eliminates, plugging by crop residue material.

Figure 2:
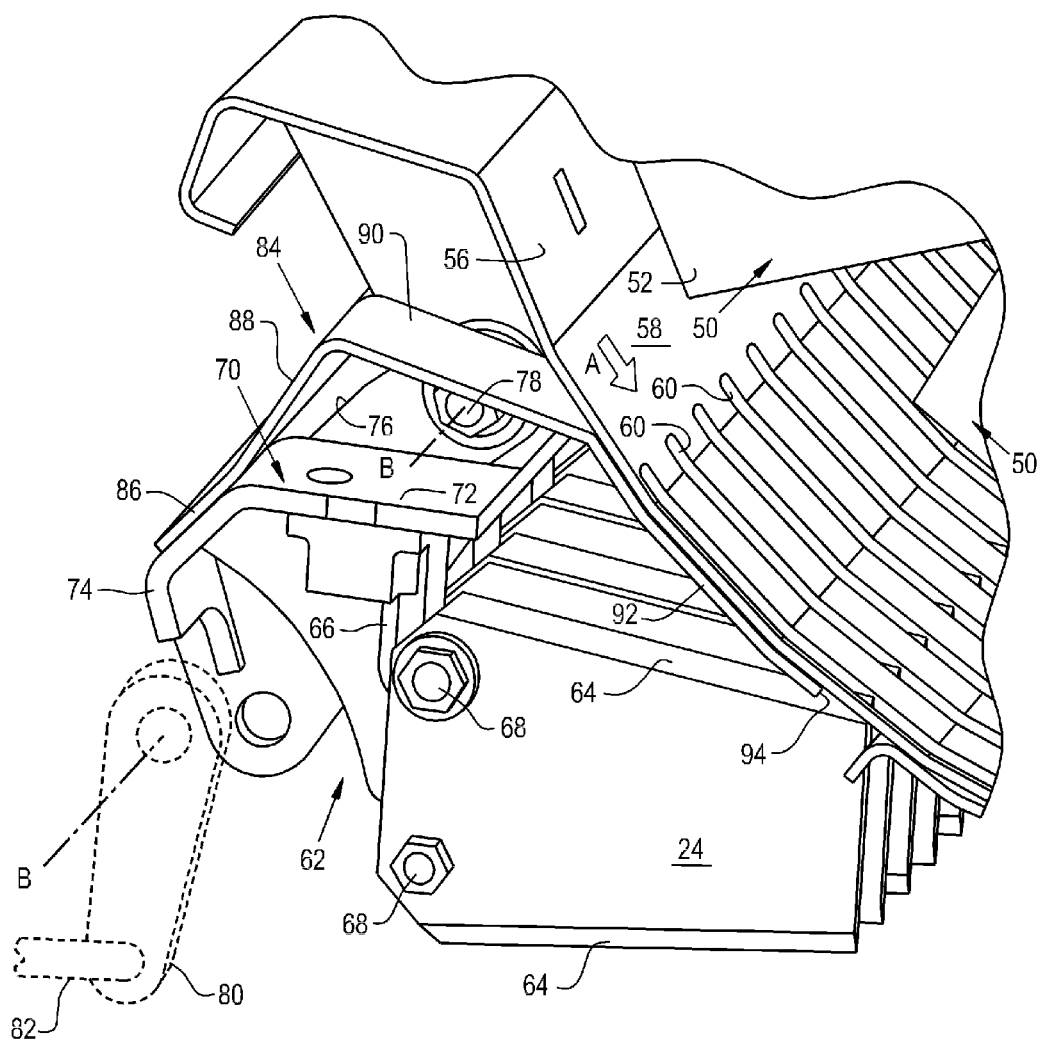
FIG. 2 is a fragmentary perspective view of the chopper assembly of FIG. 1.

As specifically shown in FIG. 2, crop residue treatment system 24 includes a rotary chopper device 50 which includes a central rotor extending transverse to the flow of crop material and which supports a plurality of knives 52, only two of which are shown. Details of such a rotary chopper device may be found in U.S. Pat. No. 8,141,805, of common assignment with the present invention, which is hereby incorporated in its entirety. Rotary chopper device 50 has adjacent thereto a chopper grate assembly 56 which is formed from sheet material extending substantially the same length as that the axial length of the rotary chopper device 50. The chopper grate assembly 56 is generally cylindrical in form and defines, with the rotary chopper assembly 50, a flow path 58 for crop residue material flowing in direction A. Chopper grate 56 has a plurality of slots 60 arranged in side-by-side relation across the width of the crop residue treatment system 24. Slots 60 extend in a direction that is generally parallel to the direction of flow A for the crop residue material.

A knife bank assembly 62 is positioned adjacent the chopper grate 56 and includes a plurality of knife elements 64, only a portion of which are shown that are positioned to be inserted through slots 60 and into flow path 58 in between the knives 52 of rotary chopper device 50. Individual knife elements 64 are fixed to mounting frames 66 by removable fasteners 68. Knife mounting frames 66 are all fastened to a main cross frame 70 extending across the length of the crop residue treatment system. Cross frame 70 includes a first section 72 providing a support for knife supports 66 and an integral second section 74 bent with respect to the plane of section 72. Section 72 has brackets 76 affixed thereto that have holes through which bolt assemblies 78 extend to provide a pivotal mounting for knife bank assembly about axis B. Knife bank assembly 62 is pivotally displaced by a crank arm 80 shown in dashed lines that has an inner end and arranged to be pivotal about axis B and an outer end receiving an actuating arm 82 also shown in dashed lines. The translation of actuating rod 82 manually or by an actuator causes crank arm 80 to pivot the knife bank assembly 62 from the positions shown in FIGS. 2 and 3 to the position shown in FIG. 4 in which the knife elements 64 fully extend into flow path 58 through slots 60.

Figure 3:
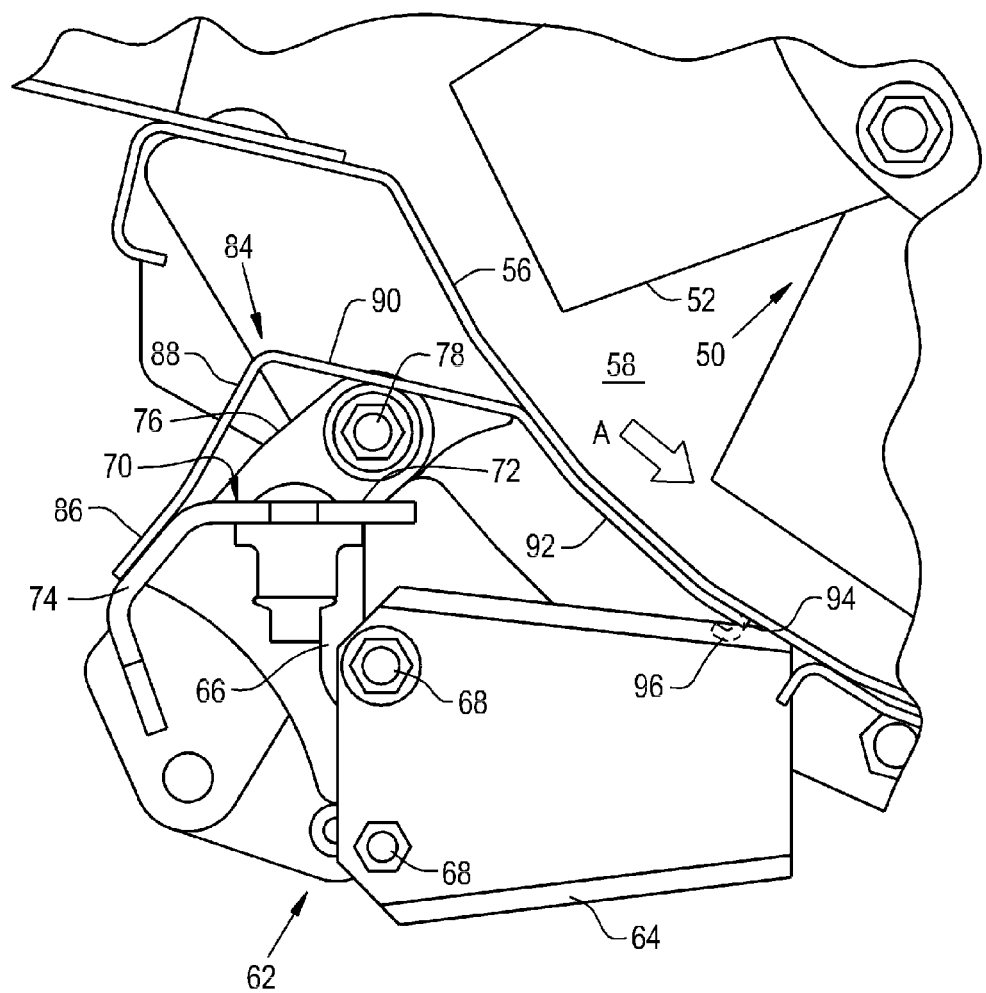
FIG. 3 is a side view of the chopper assembly of FIG. 1 in a first position.
Figure 4:
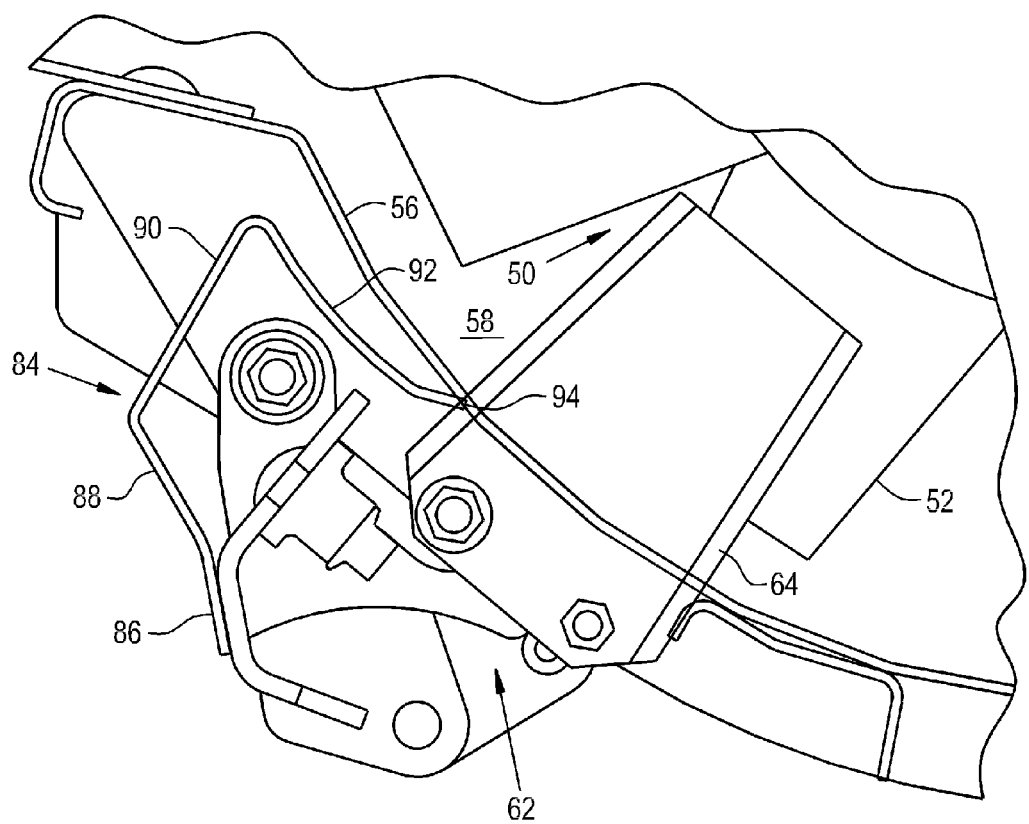
FIG. 4 is a side view of the chopper assembly of FIG. 1 in a second position.

In existing crop residue treatment systems, debris accumulates in the generally triangular area between the leading edge of knife elements 64 and the outer face of grate assembly 56. In accordance with the present invention, a deflector 84 shown in FIGS. 2-4 is employed to minimize, if not eliminate, accumulation of crop residue in the above-mentioned space. Deflector 84 is formed from flexible sheet material with sufficient stiffness to provide a resilient abutment on the outside of chopper grate 56. Although one material may be stainless spring steel, it should be apparent to those skilled in the art that other materials may also be employed. Deflector 84 extends across the width of the crop residue treatment system 24 and has a first section 86 affixed to section 74 of cross frame 70. Section 86 is secured with removable fasteners to enable replacement and fabrication although these fasteners are not shown to simplify the understanding of the present invention. Section 86 of deflector 84 continues to a second section 88 and a bend into a further section 90 and finally through an additional bend to a final section 92 that in its free state is generally contoured to fit the approximately cylindrical outer contour of chopper grate 56. As illustrated in FIG. 2, the trailing edge 94 of section 92 abuts the leading edge of knife elements 64 so that when the knife elements 64 are in the position shown in FIGS. 2 and 3, the slots 60 are substantially covered. By covering the slots 60 in this position, the accumulation of crop residue debris through and around the slots is substantially minimized. It should be noted that the trailing edge 94 of section 92 may extend beyond the leading edge of knife elements 64 by providing a notch for even further coverage.

As the knife bank assembly 62 is rotated to cause the knife elements 64 to be inserted through slots 60 and into the flow area 58, the trailing edge 94 of the deflector 84 moves with the leading edge of knife elements 64 to maintain a cover or deflector over the slots 60 to the extent that the slots 60 are not receiving a portion of the knifes 64. Because deflector element 84 is resilient sheet material, it will bend and conform to the shape of the chopper grate 56 throughout the pivoting displacement of the knife bank assembly 62. By placing the bend between the sections 88 and 90 in deflector 84, the trailing edge 94 of deflector 84 is circumferentially displaced along the exterior of chopper grate 56. This allows a smoother transition between the positions shown in FIG. 2 and the one in FIG. 4. The deflector 84 may be formed in a plurality of sections abutting one another extending along the width of the crop residue processing system 24 or it may be formed in a single unit so long as the slots 60 are covered and uncovered as stated above.

As specifically shown in FIG. 3, a plurality of hook elements 96, only one of which is shown in dashed line, may be employed adjacent the trailing edge 94 of deflector 84 to drag with them any material that may have accumulated in adjacent the leading edge of knife elements 64 to further enhance the process of eliminating debris.

Figure 5:
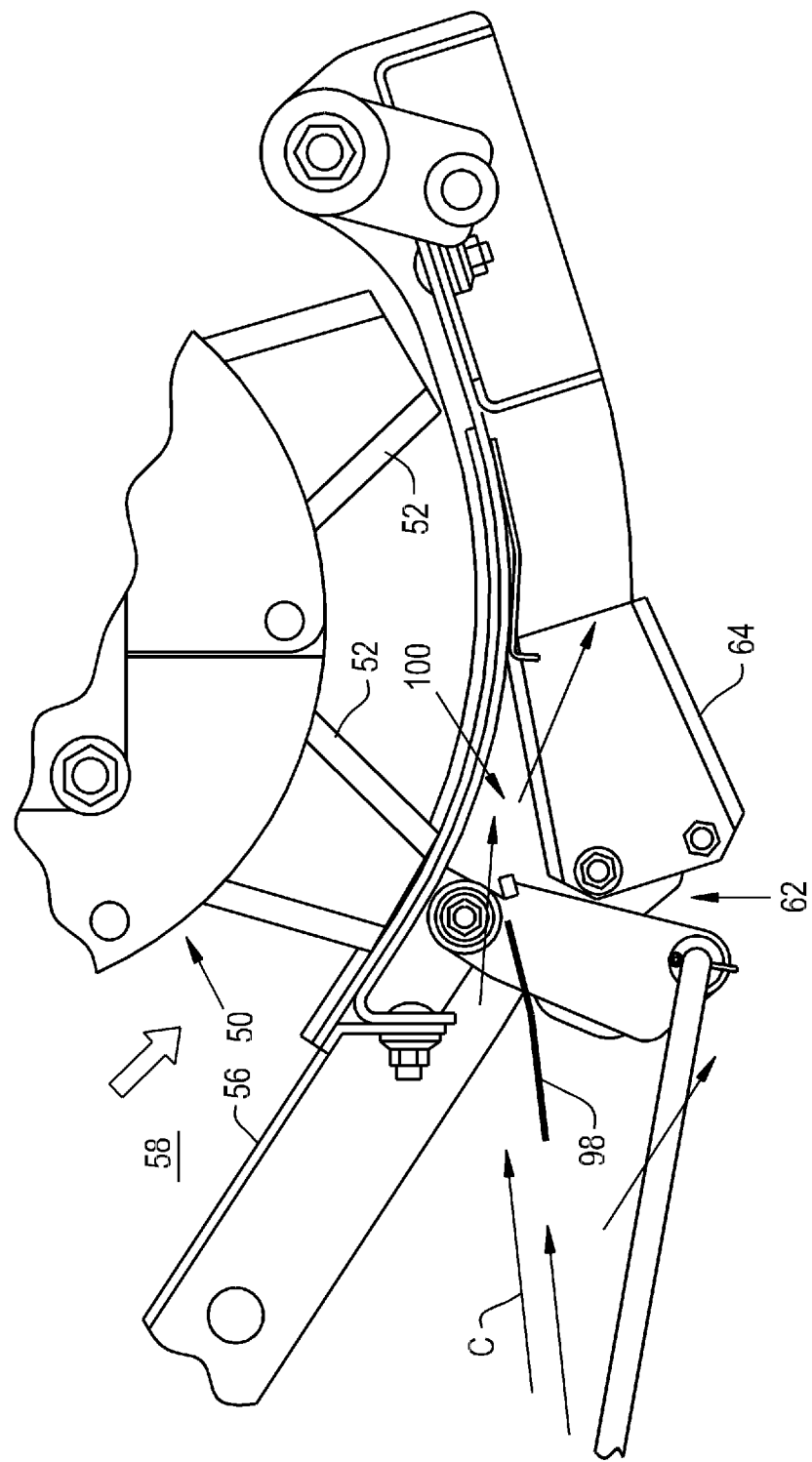
FIG. 5 is a side view of a chopper assembly incorporating an alternate embodiment of the present invention.

By providing the deflector 84, the accumulation of any debris that impedes the pivoting movement of the knife elements through the slots and into the flow path 58 is substantially minimized. This enables freer operator movement to adjust the crop residue processing system 24 to accommodate varying crops and field conditions. Furthermore, it makes operation more efficient in that it minimizes down time for cleaning FIG. 5 shows an alternate embodiment of the present invention in which the same basic crop processing elements are present (using the same reference characters as in FIGS. 2-4) but without the deflector 84. FIG. 5 shows the knife elements 64 in position out of the flow path 58 during which debris can accumulate. In accordance with this aspect of the present invention, there is provided a deflector 98 consisting of a sheet metal deflector bringing air flow C from blower 34 and duct 35 into the region 100 between the leading edge of knife elements 64 and the outer circumference of grate assembly 56. The accelerated flow of air into the region 100 by virtue of deflector 98 causes any debris that resides in the area to be blown away. Since the blower 34 is operated continuously, the cleaning process takes place continually.

Figure 6:
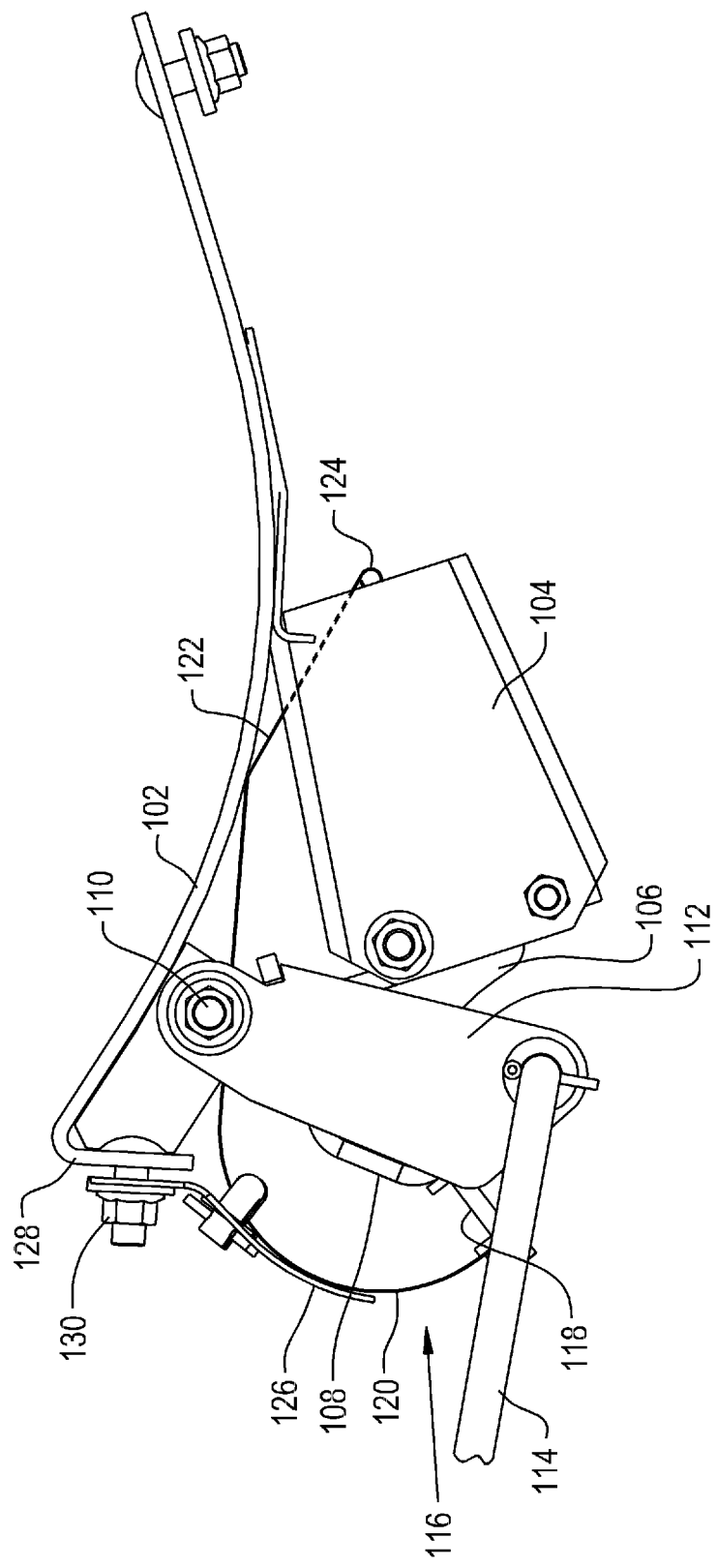
FIG. 6 is a side view of a chopper assembly incorporating another embodiment of the present invention Corresponding reference characters indicate corresponding parts throughout the several views. The exemplifications set out herein illustrate embodiments of the invention and such exemplifications are not to be construed as limiting the scope of the invention in any manner.

FIG. 6 shows yet another embodiment of the invention. In this view, a grate assembly 102 has the plurality of slots as in the previous embodiments through which a plurality of knife elements 104 (only one is shown) extend. The rotary chopper assembly shown in FIGS. 2-5 is omitted to enable a clearer understanding of this aspect of the present invention. The passage for crop residue is adjacent the upper face of the grate assembly 102.

Knife elements 104 are releasably fastened to blade supports 106 which are in turn fastened to a cross frame 108. Frame 108 is pivotally mounted to grate assembly 102 at 110. A crank arm 112 receives displacement inputs from a rod 114 to pivot frame 108 and blade elements 104 to variably extend through the slots in grate assembly 102. As shown in FIG. 6, the knife elements 104 are pivoted to be out of the crop residue passage. The blade elements 104 may be pivoted to a position where they are totally extended through the slots in grate assembly 102 and into the passageway adjacent its upper face.

In accordance with another aspect of the present invention, a deflector 116 is employed to minimize, if not eliminate the buildup of debris between the slot in the grate assembly 102 and the leading edge of the blade elements 104. Deflector 116 includes a continuous sheet 120 having an arc contour and which is fixed to frame 108 at 118. Sheet 120 curves around to abut the bottom face of grate assembly 102 and has slots 122 for embracing opposite faces of the blade elements 104. Sheet 120 ends in trailing edge hook elements 124 that variably extend across the faces of blade elements 104 as they are pivoted into the passageway.

A curved guide 126 is fastened to a flange 128 integral with grate assembly 102 by fasteners 130. The curved guide 126 directs sheet 120 in a path that facilitates following the outer contour of grate assembly 102. Guide 126 also provides a barrier against debris entering the space between the slots in guide assembly 102 and the leading edge of blade elements 104.

In operation, the sheet 120 covers slots in the grate assembly 102 and moves with the pivoting the cross frame 108 to keep debris away. In addition, hook elements 124 provide a cleaning away of debris as the knife elements 104 are pivoted into the slots in grate assembly 104.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A chopper assembly for harvesting equipment, said chopper assembly comprising:
    a rotary chopper device;
    a chopper grate assembly spaced from the rotary chopper device to form a passageway for crop residue, said chopper grate assembly including a plurality of slots extending in the direction of crop residue flow through said passageway;
    a knife bank assembly including a plurality of knife elements aligned with and insertable in said slots, said knife bank assembly being displaceable toward a position where said knife elements are fully inserted through said slots into said passageway and a position where they are substantially clear of said passageway; and,
    a deflector for covering said slots, said deflector being displaceable with said knife elements to uncover said slots as said knife elements are displaced through said slots and into said passageway.

2. The chopper assembly of claim 1, wherein said knife bank assembly includes a frame to which said knife elements are fixed.

3. The chopper assembly as claimed in claim 2, wherein the deflector is fixed to said frame for movement therewith.

4. The chopper assembly as claimed in claim 3, wherein said frame is pivotal to displace said knife elements through and into said slots.

5. The chopper assembly of claim 3, wherein said deflector is a flexible sheet.

6. The chopper assembly of claim 5 wherein the flexible sheet is bent in a continuous arc from an edge that affixes to the frame and an edge abutting said chopper grate assembly.

7. The chopper assembly of claim 6 further comprising an auxiliary guide to direct said flexible sheet as it is displaced with said knife elements to uncover said slots as said knife elements are displaced through said slots and into said passageway.

8. The chopper assembly as claimed in claim 5, wherein the deflector is formed from stainless spring steel.

9. The chopper assembly of claim 5, wherein the flexible sheet is bent into three sections, one of which is affixed to the frame, the second of which is an intermediate section and the third is a section abutting the chopper grate assembly.

10. The chopper assembly of claim 5, wherein the trailing edge of the flexible sheet at least substantially touches the knife elements.

11. The chopper assembly of claim 1, wherein said chopper grate is approximately cylindrical in form.

12. A chopper assembly for harvesting equipment, said chopper assembly comprising:
    a crop processing system including a fan for air flow in a given direction;
    a rotary chopper device;
    a chopper grate assembly spaced from the rotary chopper device to form a passageway for crop residue, said chopper grate assembly including a plurality of slots extending in the direction of crop residue flow through said passageway;
    a knife bank assembly including a plurality of knife elements aligned with and insertable in said slots, said knife bank assembly being displaceable toward a position where said knife elements are fully inserted through said slots into said passageway and a position where they are substantially clear of said passageway and a device positioned to receive air flow from said rotary crop processing device to direct a flow of accelerated air past the point adjacent the forward edge of said knife elements and on the outside of the crop chopper grate assembly.

13. The chopper assembly of claim 12, wherein said device for directing flow is a sheet metal deflector.

14. An agricultural combine comprising:
   a crop processing apparatus separating crop material from crop residue and for discharging crop residue therefrom;
   a rotary chopper device;
   a chopper grate assembly spaced from the rotary chopper device to form a passageway for crop residue from said crop processing apparatus, said chopper grate assembly including a plurality of slots extending in the direction of crop residue flow through said passageway;
   a knife bank assembly including a plurality of knife elements aligned with and insertable in said slots, said knife bank assembly being displaceable toward a position where said knife elements are fully inserted through said slots into said passageway and a position where they are substantially clear of said passageway; and,
   a deflector for covering said slots, said deflector being displaceable with said knife elements to uncover said slots as said knife elements are displaced through said slots and into said passageway.

15. The combine of claim 14, wherein said knife bank assembly includes a frame to which said knife elements are fixed and the deflector is fixed to said frame for movement therewith.

16. The combine as claimed in claim 15, wherein said frame is pivotal to displace said knife elements through and into said slots.

17. The combine of claim 16, wherein said deflector is a flexible sheet formed from stainless spring steel.

18. The combine of claim 17, wherein the trailing edge of the flexible sheet at least substantially touches the knife elements.

19. The combine of claim 18, wherein the trailing edge of the flexible sheet includes a plurality of hook elements.

20. The combine of claim 19, wherein said hook elements project between adjacent knife elements.

* * * * *